May 5, 1964　　　J. F. PRIBONIC　　　3,132,237
METHOD OF ASSEMBLING AND SECURING SHOCK ABSORBER
GUIDE SLEEVES TO OPERATING RODS
Filed May 8, 1961

INVENTOR.
JOHN F. PRIBONIC
BY
HIS ATTORNEY

United States Patent Office 3,132,237
Patented May 5, 1964

3,132,237
METHOD OF ASSEMBLING AND SECURING SHOCK ABSORBER GUIDE SLEEVES TO OPERATING RODS
John F. Pribonic, Dayton, Ohio, assignor to General Motors Corporation, Detroit, Mich., a corporation of Delaware
Filed May 8, 1961, Ser. No. 108,437
3 Claims. (Cl. 219—107)

This invention relates to a method of making hydraulic shock absorbers of the direct-acting, tubular type.

An object of the invention is to provide a method of making a shock absorber of the aforementioned type including a piston reciprocable in a cylinder wherein the shock absorber includes a rebound cutoff to greatly increase the resistance to movement of the piston of the shock absorber in the end portion of its rebound stroke, the rebound mechanism including a cylinder sleeve positioned around a reduced diameter portion of a rod that carries a shock absorber piston to provide a chamber space through which fluid flows from the rebound chamber through the shock absorber piston, the cylinder sleeve being secured to the rod by a deformed end portion of the cylinder sleeve retained within a groove in the rod to resist or prevent axial movement of the sleeve on the rod.

A further object of the invention is to provide a method of making a shock absorber piston rod having a cylinder sleeve assembled on the same and retained in spaced concentric relation relative to a reduced diameter portion of the rod to form a chamber space between the reduced diameter portion and the cylinder sleeve, the cylinder sleeve being secured to the rod by a deformed end portion of the cylinder sleeve being retained in a groove in the rod to prevent axial movement of the sleeve relative to the rod.

A further object of the invention is to provide a method of making a shock absorber having the features mentioned in the foregoing object by a method of attachment of the cylinder sleeve to the shock absorber piston rod by heating the end of the cylinder sleeve that engages a shoulder on the piston rod to a temperature sufficient to effect plastic deformation of the heated end of the cylinder sleeve with pressure being applied axially to the sleeve concurrent with the heating of the end of the sleeve so that the heated end of the sleeve will be deformed into a groove in the cylinder rod, the deformed end of the cylinder sleeve, upon cooling, retaining the cylinder sleeve against axial movement on the rod and bonding the heated end of the cylinder sleeve to the rod.

A still further object of the invention is to provide a method of assembling a cylinder sleeve on a rod in accordance with the foregoing object wherein the heating of the end of the cylinder sleeve is effected by applying electric current to the rod and to the cylinder sleeve so that the end of the cylinder sleeve engaging a shoulder on the rod will be heated by electric resistance concurrently with the pressure applied axially on the sleeve to effect plastic deformation of the end of the sleeve into a groove in the piston rod and bond or weld the sleeve to the rod.

Further objects and advantages of the present invention will be apparent from the following description, reference being had to the accompanying drawings wherein preferred embodiments of the present invention are clearly shown.

Figure 1:
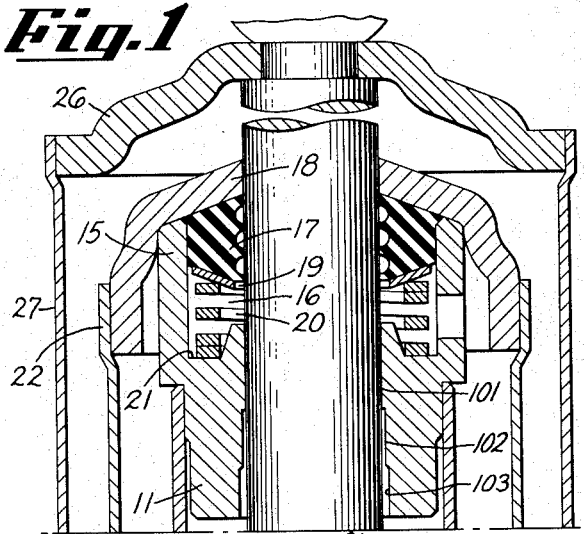
FIGURE 1 is a longitudinal cross-sectional view of a shock absorber incorporating features of this invention.
Figure 1:
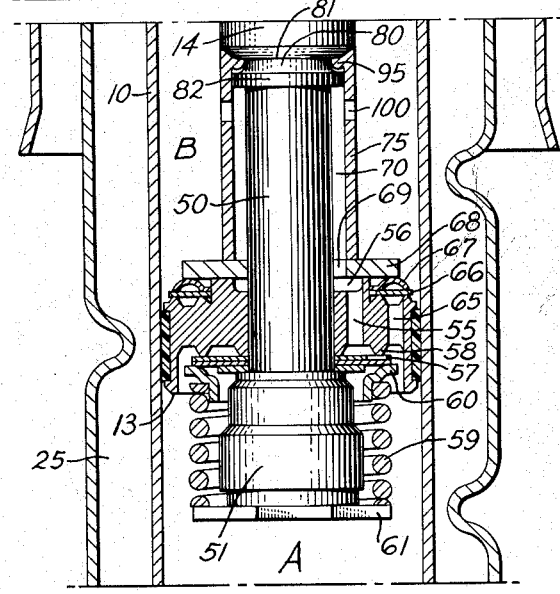
Figure 1:
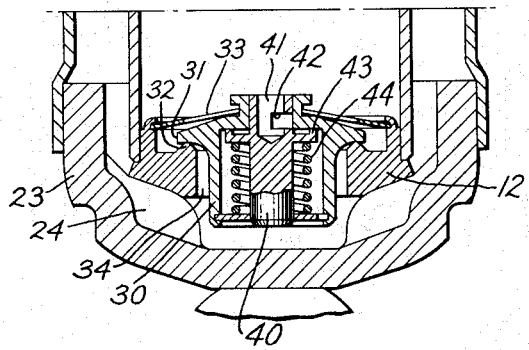

As illustrated in the drawings, the shock absorber consists of a pressure cylinder 10 having a rod guide member 11 at one end thereof that forms a closure wall at one end of the pressure cylinder. The pressure cylinder 10 is also provided with the closure wall 12 at the opposite end thereof which also forms a part of a base valve structure more fully described hereinafter. A piston 13 is reciprocable in the cylinder 10 and divides the cylinder into a compression chamber A and a rebound chamber B. The piston 13 is carried on the lower end of a rod 14 that extends through the rebound chamber B and through the rod guide member 11, the rod 14 thus being guided in its reciprocal movement of the piston 13.

The closure member 11 includes an annular wall 15 forming a seal chamber 16 that contains a rod seal member 17 retained in the chamber 16 by a closure cap 18 that rests on the upper end of the wall 15. A seal retaining member 19 is held against the lower end of the seal member 17 by a compression spring 20 between the member 19 and the bottom wall 21 of the seal chamber 16. The closure cap 18 is secured to the upper end of a reservoir tube 22 that has its lower end secured to a closure cap 23 that encloses the closure wall 12 at the bottom end of the pressure cylinder 10. A plurality of ridges 24 support the closure wall 12 and the included base valve structure thereof in spaced relation to the cap 23 to form fluid flow passages for hydraulic fluid passing from the compression chamber A into the reservoir space 25 provided between the pressure cylinder tube 10 and the reservoir tube 22.

The exterior end of the rod 14 supports a cap 26 that in turn supports a dust tube or stone shield 27 that prevents injury or denting of the reservoir tube 22.

The closure wall 12 is a part of a base valve structure that includes a first valve member 30 having a flanged portion 31 seated on the wall seat 32 by means of a light finger spring 33 to close the central axial port 34, but which light finger spring 33 allows the valve member 30 to lift from its seat to provide for substantially free flow of hydraulic fluid from the reservoir space 25 into the compression chamber A.

The valve member 30 carries a plug valve 40 having an axial bore 41 and a radial passage 42 that provides for flow of hydraulic fluid from the compression chamber A past the seat 43 of the valve 40 as urged against the compression spring 44 to allow for exhaust of hydraulic fluid under pressure from the compression chamber into the reservoir space 25 during the compression stroke of the shock absorber.

The rod 14 is provided with a reduced diameter portion 50 at the lower end thereof that receives the piston 13, the reduced diameter portion 50 of the rod extending through the piston 13 and receiving a retaining nut 51 on the terminus end of the reduced diameter rod portion 50 by means of a threaded connection between the rod portion 50 and the retaining nut 51.

The piston 13 is provided with a first series of axially positioned passage means 55 which are disposed in the piston 13 on a common circle about the axis of the piston, the passage means 55 consisting of a plurality of individual passages. The upper ends of the passage means 55 are in fluid connection with a recessed chamber 56 provided in the upper face of the piston 13 at the rebound chamber side of the piston so as to receive hydraulic fluid from the rebound chamber B in a manner hereinafter described. The lower ends of the passage means 55 are closed by a disc valve means 57 which allows fluid flow from the rebound chamber into the compression chamber A but which resists or prevents return flow. The disc valve 57 is retained on its valve seat, or seats 58 by means of a compression spring 59 held between a retaining ring 60 and the flanged end 61 of the retaining nut 51.

The piston 13 is provided with a second series of valved passage means 65 arranged as a plurality of individual passages in a common circular arrangement in the piston 13 and disposed axially therein. These passage means 65 are normally closed by a disc valve means 66 held on its seat, or seats, by a spring 67, the disc valve 66 and the spring 67 being retained in position by a valve backing disc 68 positioned on the upper face of the piston 13 and which partially closes the recessed chamber 56.

The valve backing disc 68 is provided with a plurality of passages 69 providing fluid communication between the recessed chamber 56 and a chamber space 70 provided between the reduced diameter portion 50 of the rod 14 and a cylinder sleeve 75 that has one end thereof abutting the backing disc 68 and has the opposite end secured to the rod 14 in a manner hereinafter described.

Figure 2:
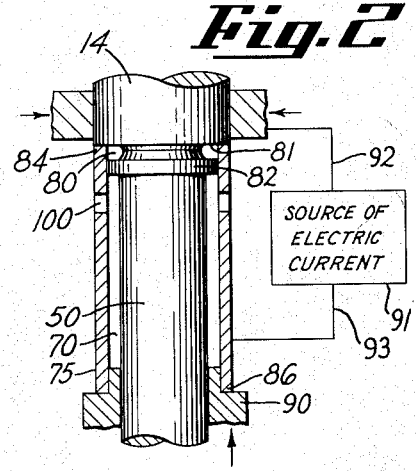
FIGURE 2 is a cross-sectional view illustrating a step in the method of attaching a cylinder sleeve to the shock absorber piston rod.

The rod 14 is shaped with an annular groove 80 that forms a shoulder 81, the groove 80 being formed by the cooperation between the shoulder 81 and a radial annular flange 82 on the reduced diameter portion 50 of the rod. The shoulder 81, when initially formed on the rod 14 is a right angular shoulder normal to the axis of the rod 14, as shown in FIGURE 2, FIGURE 2 illustrating the initial step of attaching the cylinder sleeve 75 to the rod 14. The annular flange 82 is of the same diameter as the internal diameter of the sleeve 75 so that initial placement of the sleeve over the reduced diameter portion of the rod 50, as shown in FIGURE 2, will retain the sleeve 75 concentric with the rod portion 50, as well as with the larger diameter of the rod 14.

As illustrated in FIGURE 2, the rod 14 is shaped with a groove 80 positioned between the radial annular flange 82 and the shoulder 81 that is formed by the groove, the shoulder 81 being normal to the axis of the rod 14 to form an abutment surface for the terminus end 84 of the sleeve 75.

In FIGURE 2 the cylinder sleeve 75 is illustrated as assembled upon the reduced diameter portion 50 of the rod 14, and encircling the same with its terminus end 84 in abutting engagement with the shoulder 81. A force member 90, operated by any suitable force actuating device, such as a hydraulic mechanism or a pneumatic mechanism engages the opposite terminus end 86 of the cylinder sleeve 75 to apply pressure or force to the sleeve 75 in an axial direction and thereby urge the end 84 of the sleeve 75 against the shoulder 81 on the rod 14.

Figure 3:
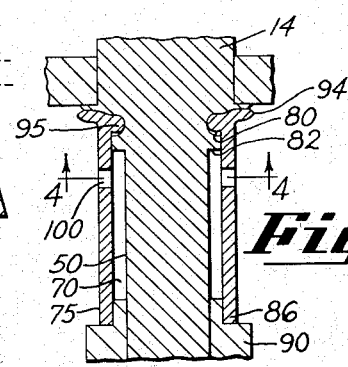
FIGURE 3 is a cross-sectional view illustrating a second step in the method of attaching a cylinder sleeve to a shock absorber piston rod.
Figure 4:
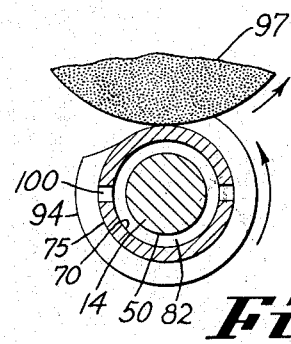
FIGURE 4 is a cross-sectional view illustrating a third step in the method of manufacture of the sleeve and piston rod assembly illustrated in FIGURES 2 and 3.

The end portion 84 of the sleeve 75 is then heated sufficiently that under the force or pressure condition applied by the member 90 there will be a plastic flow of the end portion 84 of the sleeve 75 to substantially fill the groove 80 with a deformed end portion 95, as shown in FIGURE 1 and in FIGURE 3.

As shown in FIGURE 2, the heating of the end portion 84 of sleeve 75 can be occasioned by resistance heating, a suitable source of electric current 91 being provided with electric conductors 92 and 93 being connected to the sleeve 75 and the rod 14, respectively, so that the abutment engagement between the end 84 of the sleeve 75 and the shoulder 81 becomes an electrical resistance in the circuit so that the sleeve end 84 and the shoulder 81 are resistively heated with the result that plastic deformation occurs at the end of the sleeve 75 to substantially fill the groove 80, as shown in FIGURES 3 and 1 with the deformed portion of the sleeve bonding to the rod 14.

When the axially directed pressure is applied by the force member against the sleeve 75, the plastic deformation of the end 84 of the sleeve and the shoulder 81 on the rod will result in some radial flash 94 at the juncture between the two surfaces, the two surfaces becoming bonded together by the resistance welding that has occurred by the resistance heating of the respective surfaces. This is illustrated in FIGURE 3.

The thus assembled sleeve 75 and rod 14 are then placed in a suitable machine and the flash 94 removed, such as by a grinding wheel 97 to machine the periphery of the rod 14 and the sleeve 75 to the same external diameter.

The upper end of the sleeve 75 is provided with a plurality of openings 100 positioned remotely from the piston 13 in the direction of the rod guide 11, the passages 100 providing for hydraulic fluid flow from the rebound chamber B into the chamber space 70 from whence the fluid can flow through the passages 69 in the valve backing disc 68 and thence into the recessed chamber 56 in the piston 13 for flow through the passage means 55 into the compression chamber A under the resistance of the action of the disc valve means 57.

The rod guide member 11 is provided with a rod guide portion 101 in which the rod 14 reciprocates. Immediately below the rod guide portion 101 there is provided a portion 102 of slightly increased diameter and below that a second portion 103 of again slightly increased diameter. These portions 102 and 103 cooperate with the openings 100 in the sleeve 75 to restrict flow of hydraulic fluid from the rebound chamber B when the piston approaches the end of its rebound stroke, the openings 100 first entering the enlarged portion 103 in the rod guide 11 to give a first increase to resistance to flow of hydraulic fluid from the rebound chamber B which is then increased when passages 100 enter the portion 102 in the rod guide 11 and is then completely cut off from flow from the rebound chamber B when the passages 100 enter the guide portion 101 of the rod guide 11. This latter entraps the hydraulic fluid between the rod guide 11 and the piston 13 to highly restrict the movement of the piston 13 toward the rod guide 11 in the end portion of the rebound shock absorber.

During the compression stroke, that is with the piston 13 moving toward the base valve structure 40, the shock absorber functions normally with the base valve member 40 restricting hydraulic fluid flow from the compression chamber A during the compression stroke and valve element 30 providing for substantially free return flow of hydraulic fluid into the compression chamber A from the reservoir space 25 during the rebound stroke.

While the embodiments of the present invention as herein disclosed constitute preferred forms, it is to be understood that other forms might be adopted.

What is claimed is as follows:

1. The method of securing a sleeve cylinder on a rod in encircling concentric spaced relation, comprising the steps of, shaping a cylindrical rod with an annular groove forming an annular shoulder and with a reduced diameter end portion spaced axially from the groove with an annular radial flange portion formed thereby between said groove and said reduced diameter portion with said flange portion of a diameter less than said rod but greater than said reduced diameter portion, positioning a sleeve cylinder on said reduced diameter portion to encircle the same with one end positioned over said groove and abutting said shoulder, and heating said end portion of said sleeve cylinder to a temperature sufficient to permit plastic deformation of the said end portion while concurrently applying pressure to said sleeve cylinder in an axial direction to effect thereby deformation of the said end portion into said groove between said shoulder and said flange portion, and then allowing said end portion to cool to retain the deformed contour in said groove and lock thereby said sleeve against axial movement on said rod.

2. The method of securing a sleeve cylinder on a rod in encircling concentric spaced relation, comprising the steps of, shaping a cylindrical rod with an annular groove forming a radial shoulder and with a reduced diameter end portion spaced axially from the groove with an annular radial flange portion formed thereby between said groove and said reduced diameter portion with said flange portion of a diameter less than said rod but greater than said reduced diameter portion, positioning a sleeve cylinder on said reduced diameter portion to encircle the same with one end positioned over said groove and abutting said shoulder, applying an electric current to said rod and to said sleeve to effect resistance heating of the said end portion of said sleeve adjacent said shoulder to a temperature sufficient to permit plastic deformation of the said end portion of said sleeve cylinder while concurrently applying pressure axially to said sleeve to effect plastic flow of the said end portion of said sleeve into said groove between said shoulder and said flange portion, and then allowing the said deformed end portion to cool to effect locking of said sleeve against axial movement on said rod.

3. The method of securing a sleeve cylinder on a rod as set forth in claim 2 wherein after the said end portion of said sleeve is cooled the external diameter of the said rod and of said sleeve are shaped to a common uniform diameter.

References Cited in the file of this patent

UNITED STATES PATENTS

| | | |
|---|---|---|
| 1,691,778 | McDonald | Nov. 13, 1928 |
| 1,908,206 | Winning | May 9, 1933 |
| 2,374,270 | Brock | Apr. 24, 1945 |
| 2,564,391 | Burns | Aug. 14, 1951 |
| 2,606,630 | Rossman | Aug. 12, 1952 |
| 2,794,244 | Uecker | June 4, 1957 |
| 2,843,926 | Turner | July 22, 1958 |
| 2,907,414 | Patriquin | Oct. 6, 1959 |

FOREIGN PATENTS

| | | |
|---|---|---|
| 304,416 | Germany | Apr. 29, 1917 |